US009292567B2

(12) United States Patent
Dua (10) Patent No.: US 9,292,567 B2
(45) Date of Patent: Mar. 22, 2016

(54) BULK MATCHING WITH UPDATE

(71) Applicant: ORACLE INTERNATIONAL CORPORATION, Redwood Shores, CA (US)

(72) Inventor: Swaranjit Singh Dua, Arcadia, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 156 days.

(21) Appl. No.: 13/721,799

(22) Filed: Dec. 20, 2012

(65) Prior Publication Data

US 2013/0110845 A1    May 2, 2013

Related U.S. Application Data

(63) Continuation-in-part of application No. 11/955,219, filed on Dec. 12, 2007, now Pat. No. 8,943,057.

(51) Int. Cl.
*G06F 17/30* (2006.01)

(52) U.S. Cl.
CPC .... *G06F 17/30424* (2013.01); *G06F 17/30303* (2013.01); *G06F 17/30321* (2013.01); *G06F 17/30489* (2013.01); *G06F 17/30595* (2013.01)

(58) Field of Classification Search
CPC ............... Y10S 707/99943; Y10S 707/99933; Y10S 707/99935; Y10S 707/99936; Y10S 707/99945; Y10S 707/99948; Y10S 707/99952; G06F 17/30592; G06F 17/30489; G06F 17/3002; G06F 17/30289; G06F 17/30321; G06F 17/30324; G06F 17/30445

USPC ......... 707/741, 600, 602, 603, 737, 769, 770, 707/774, 803, 718, 752, 758
See application file for complete search history.

(56) References Cited

U.S. PATENT DOCUMENTS

| | | | |
|---|---|---|---|
| 6,405,218 B1 * | 6/2002 | Boothby | 707/999.2 |
| 6,795,819 B2 * | 9/2004 | Wheeler et al. | 707/691 |
| 6,816,854 B2 | 11/2004 | Reiner et al. | |
| 6,968,348 B1 * | 11/2005 | Carone et al. | 707/696 |
| 7,107,297 B2 * | 9/2006 | Yellepeddy et al. | 707/999.1 |
| 7,305,404 B2 * | 12/2007 | Owens et al. | 707/999.003 |
| 7,324,447 B1 | 1/2008 | Morford | |
| 7,325,013 B2 | 1/2008 | Caruso | |
| 7,376,680 B1 * | 5/2008 | Kettler et al. | 707/999.202 |
| 7,386,554 B2 * | 6/2008 | Ripley et al. | 707/999.01 |
| 7,392,248 B2 | 6/2008 | Bakalash et al. | |
| 7,395,386 B2 * | 7/2008 | Barrs et al. | 711/161 |
| 7,403,136 B2 | 7/2008 | De La Cruz et al. | |
| 7,406,477 B2 | 7/2008 | Farrar et al. | |
| 7,469,241 B2 | 12/2008 | Bellamkonda et al. | |
| 7,546,294 B2 | 6/2009 | Hullender et al. | |
| 7,650,331 B1 | 1/2010 | Dean et al. | |
| 7,680,828 B2 * | 3/2010 | Gorelik | 707/763 |
| 7,747,480 B1 * | 6/2010 | Agresta et al. | 705/28 |

(Continued)

*Primary Examiner* — Dangelino Gortayo
(74) *Attorney, Agent, or Firm* — Kraguljac Law Group, LLC (57) ABSTRACT

Systems, methods, and other embodiments associated with bulk matching with update functionality are described. In one embodiment, a method includes receiving a first new record for matching with other records. The method includes querying a database that stores respective single best records (SBR) for respective sets of matching records to return SBR information. The first new record is matched to the other records by comparing the first new record to the SBR information to identify an SBR that matches the first new record. The first new record is associated with the identified SBR in the database.

12 Claims, 6 Drawing Sheets

(56) References Cited

U.S. PATENT DOCUMENTS

| | | |
|---|---|---|
| 7,774,347 B2* | 8/2010 | Millett et al. ............... 707/747 |
| 7,899,796 B1* | 3/2011 | Borthwick et al. .......... 707/692 |
| 8,166,033 B2* | 4/2012 | Kazi et al. .................. 707/737 |
| 8,332,366 B2* | 12/2012 | Schumacher et al. ....... 707/688 |
| 2002/0099691 A1 | 7/2002 | Lore et al. |
| 2004/0078364 A1 | 4/2004 | Ripley et al. |
| 2006/0212416 A1* | 9/2006 | Taylor et al. ................ 707/1 |
| 2007/0282827 A1 | 12/2007 | Levin |

* cited by examiner

BULK MATCHING WITH UPDATE

CROSS REFERENCE TO RELATED APPLICATIONS

This disclosure is a continuation-in-part of U.S. patent application Ser. No. 11/955,219 filed Dec. 12, 2007, titled "METHOD AND SYSTEM FOR DISTRIBUTED BULK MATCHING AND LOADING", which is hereby incorporated by reference in its entirety for all purposes.

BACKGROUND

Currently, many different types of software applications provide record matching for records stored in a relational database or other type of storage medium. Record matching has many uses. For example, through record matching, matching system objects (e.g., records) can be aggregated into enterprise objects that include all system objects that describe the same entity. For each enterprise object, a single best record (SBR) may be generated that is the best representation of an entity's information. The SBR is populated with information from all of the matching system objects that describe the entity. Each enterprise object, which corresponds to a single entity, is assigned an enterprise unique identifier (EUID). An EUID is a linked identifier that links all system objects that describe a given entity (e.g., an SBR). EUIDs are stored a master index database that stores SBRs, which include the EUID linked identifier. In this manner the master index database can provide a single view of data from multiple applications.

Matching applications typically use probabilistic matching algorithms to match and link records that describe a single entity. Using such probabilistic algorithms, determining whether two records match requires computing match weights of some designated match fields in a record and adding weights for all such fields. The weights are then compared with a designated match threshold weight to determine whether the records belong to the same overall profile. For example, suppose the user-defined match threshold weight is 40, and the following record pair is matched:
Record 1: John Smith Jan. 1, 2007 Los Angles Calif.
Record 2: Joe Smit Jan. 1, 2007 Los Angeles Calif.
If the match weight computed by a match engine is greater than or equal to a match weight of 40, then the above two records are classified as a match pair. Alternatively, if the match weight computed for the above two records is below a match weight of 40, then the records are classified as a non-match pair.

Another method for matching records in larger relational databases uses block record matching. A block is a set of records that have one or more fields in common, such as "SSN" or "firstName AND lastName." With block record matching, based on the input record received by the relational database, a list of records with one or more combinations of common field values is fetched. Thus, a block of records is created, which reduces the number of record pairs that need to be matched with one another. Each record from the block of records can then be sent to the matching engine, where the matching engine compares multiple field values from each record pair in the block of records to determine whether a match to the input record exists.

To improve the performance of record matching operations, bulk matching and loading systems may distribute performance of matching operations among multiple slave computing devices. The distribution of matching operations is performed on a block basis such that each block of records is processed by a single slave computing device in parallel with other blocks of records being processed by other slave computing devices. Since each slave computing device performs matching on complete blocks of records, the matching can be performed independent of other slave computing devices.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Often, an enterprise has a large master index database that stores enterprise objects resulting from the matching of many records. As new records are received, the master index is modified to reflect the data in the new records. Typically, the modification of the master index database is performed by clearing the master index database, matching all records (e.g., the many old records augmented by the newly received records), and storing SBRs generated by the matching process in the master index database. No mechanism has been provided for updating existing SBRs to reflect data from new records that match the existing enterprise objects.

Systems and methods are described herein that provide a mechanism for updating a master index database that stores existing SBRs to reflect new data without having to re-perform matching operations that yielded the existing SBRs.

Figure 1:
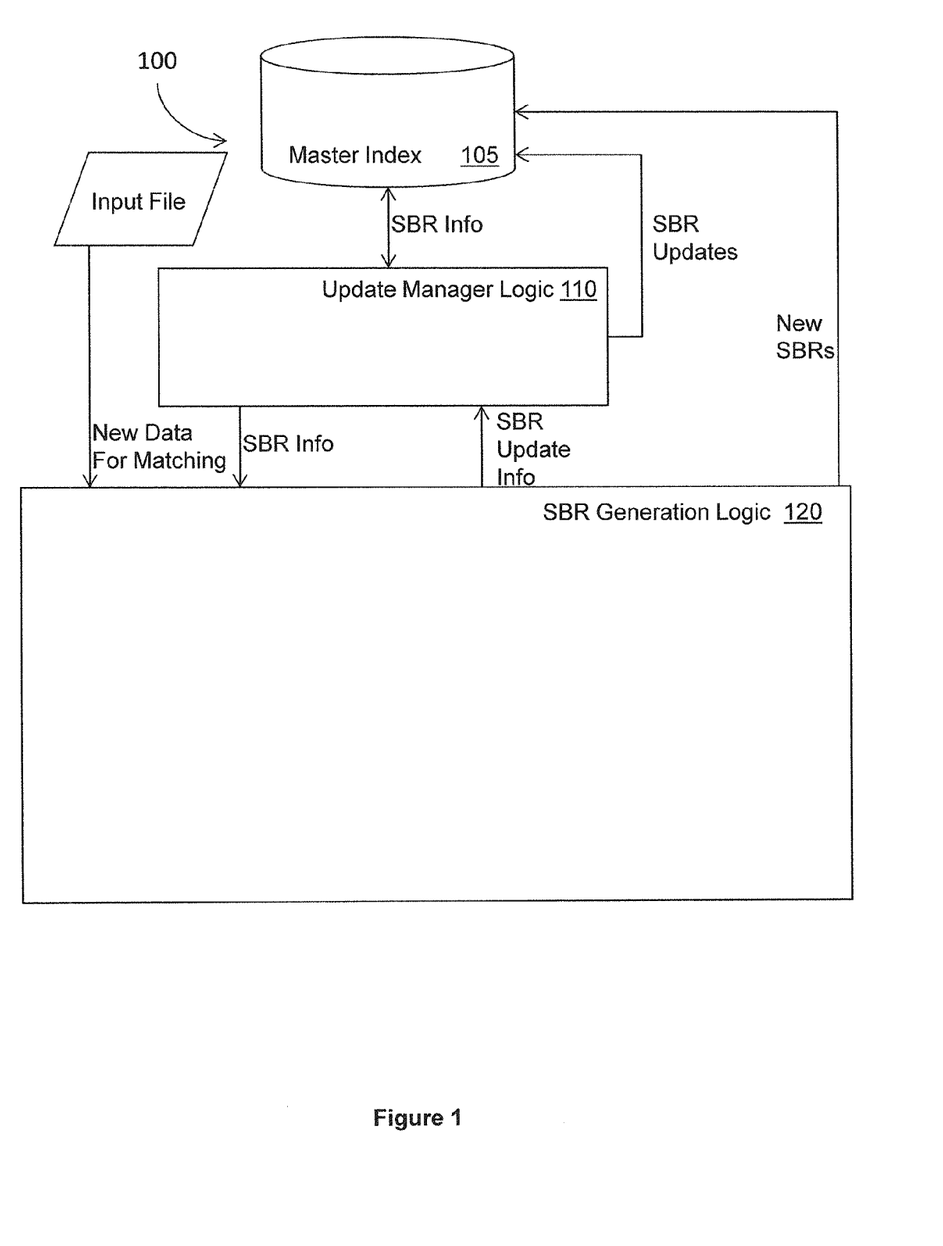
FIG. 1 illustrates one embodiment of a system associated with distributed bulk matching that enables updates to existing matched data.

With reference to FIG. 1, one example embodiment of a system 100 that performs bulk matching and includes update functionality is illustrated. The system 100 maintains a master index database 105 that stores SBRs that are the result of matching operations performed by an SBR generation logic 120. The system 100 includes an update manager logic 110. The update manager logic 110 interacts with the master index database 105 and the SBR generation logic 120 to update SBRs that are already stored in the master index database 105 to reflect new records in an input file without having to re-perform matching operations that yielded the existing SBRs.

To update the master index database 105, the SBR generation logic 120 receives an input file with a new record for matching with "old" records that have already been through the matching process. The old records may be records that have already been matched by the system 100. The update manager logic 110 retrieves information about SBRs that are already stored in the master index database 105. In one embodiment, the SBR information includes SBR match field values for the SBRs. Match field values are data values for selected data fields that are used for matching by the SBR generation logic 120. Thus, not all SBR data fields are provided to the SBR generation logic 120, improving performance and reducing the memory needed to perform matching.

The SBR information is provided to the SBR generation logic 120, which uses the SBR information to perform matching between the new record and the SBRs in the master index database 105. In this manner, the new record is "indirectly" matched to the records that have already been matched to create the SBRs in the master index database 105. Any number of matching techniques, including the techniques that will be described below, may be used to match the new record to the SBRs in the master index database 105. In one embodiment, the new record is matched to the SBRs by comparing the new record's match field values to the SBR match field values and identifying an SBR having similar SBR match field values as compared to the new record match field values.

After the new record has been matched, if an SBR was identified as matching the new record, the update manager logic 110 associates the new record with the SBR in the master index database 105. In one embodiment, information about how to update the SBR is provided to the update manager logic 110 by the SBR generation logic 120. The update manager logic 110 uses the SBR update information to update the SBR in the master index database 105. In this manner, the SBR is updated without re-performing the matching the matching operations that yielded the SBR.

The SBR generation logic 120 is also configured to perform matching between the new records in the input file. Any new records that do not match an SBR but match each other are used to create new SBRs. The SBR generation logic 120 stores the new SBRs in the master index database 105. In one embodiment, the SBR generation logic 120 uses a different technique for storing the new SBRs as compared to the updating technique that is employed by the update manager logic 110. In this manner, a data loading technique that is best suited for storing new SBRs, (e.g., a fast database loader) may be utilized by the SBR generation logic 120 while a data loading technique best suited for updating existing SBRs (e.g., a data update API such as Java Database Connectivity) may be utilized by the update manager logic 110.

Figure 2:
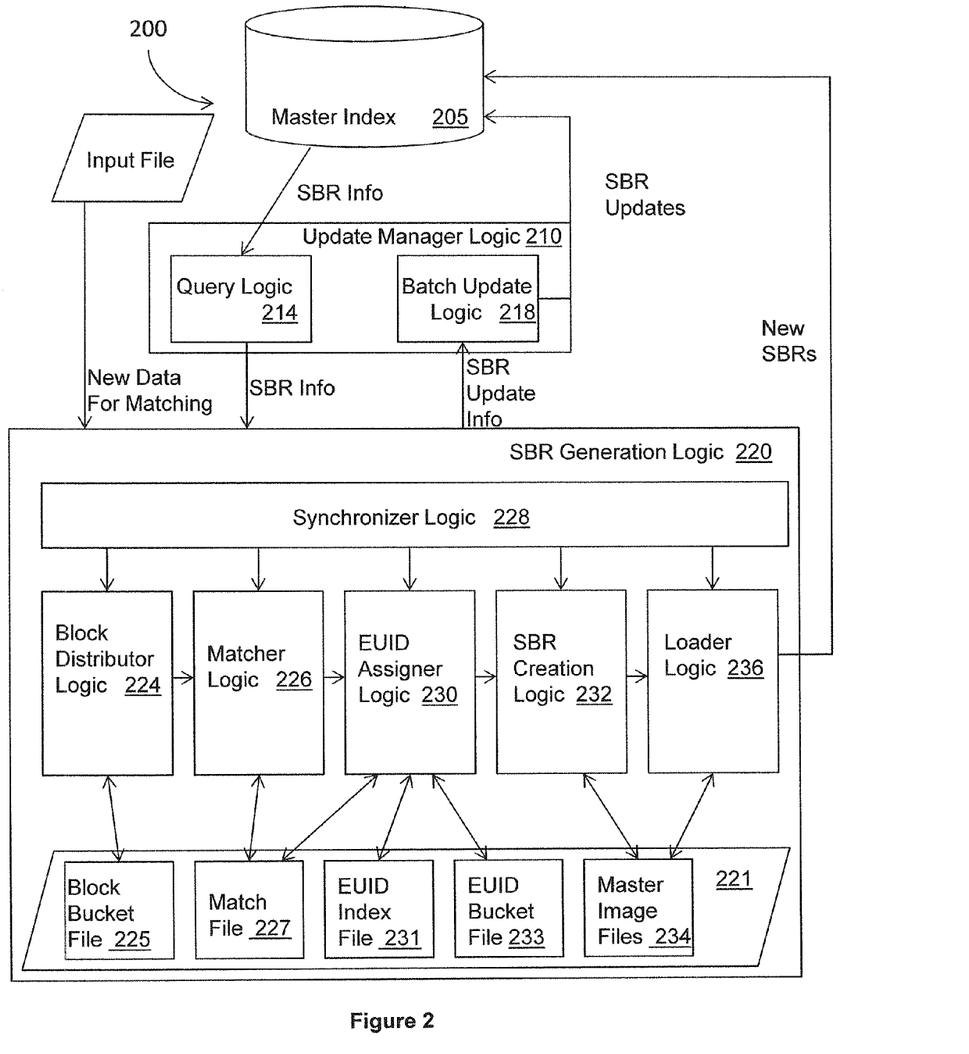
FIG. 2 illustrates another embodiment of a system associated with distributed bulk matching that enables updates to existing matched data.

FIG. 2 illustrates one example embodiment of a system 200 that performs bulk matching and provides update functionality. The system 200 includes an SBR generation logic 220 that performs matching operations in a distributed manner to improve performance. The system 200 maintains a master index database 205 that stores SBRs. The system 200 also includes an update manager logic 210. The update manager logic 210 interacts with the master index database 205 and the SBR generation logic 220 to enable SBRs that are already stored in the master index database 205 to be updated to reflect new records in an input file without having to re-perform matching operations that yielded the existing SBRs.

The SBR generation logic 220 includes a block distributor logic 224, a matcher logic 226, a cluster synchronizer 228, an enterprise unique identifier (EUID) assigner logic 230, an SBR creation logic 232, a file system 221 configured to store various types of data, and a loader logic 236.

In one embodiment, the system 200 is a master computing device (i.e., a master loader) that uses a distributed architecture including several slave computing devices as shown in FIG. 2. Thus, some tasks may be performed by the master loader, while other tasks may be performed by slave loaders in parallel. Further, there may be any number of slave computing devices included in the distributed architecture. In one or more embodiments of the invention, the slave computing devices may be multiple threads executing on a single computing device and/or may include multiple computing devices. Further, each computing device may include single-core or multi-core processors.

The cluster synchronizer 228 is configured to ensure coordination among the various distributed, slave computing devices. In one embodiment, each concurrent computing device works on the same task at the same time, and does not move onto the next task until all the concurrent computing devices have completed the current task. To facilitate such coordination, the cluster synchronizer 228 stores relevant information regarding the status of the various components that participate in the matching process. Further, the cluster synchronizer 228 is notified when each task is begun and completed by the component(s) that is/are responsible for performing each task. In one or more embodiments of the invention, the cluster synchronizer 228 is an in-memory Java object that is invoked by other components when each component's task is completed or when additional data is needed to perform one or more tasks. The cluster synchronizer 228 may store the aforementioned relevant information in any type of data structure, such as a database table, an array, a link list, or any other type of data structure.

The block distributor logic 224 is a master task that is executed by the system 200. The block distributor logic 224 is configured to receive an input file that includes one or more records for matching. In one or more embodiments of the invention, the input file may include data from multiple systems and obtained from one or more sources. For example, the input file may be records obtained from one or more customer databases, file systems, persistent storage, or any other type of storage medium on which records are stored.

Each record may be a hierarchical structure. Further, each field in each record may be separated by delimiters. A record may be structured in any suitable manner. Further, records may include any type of data. For example, records may include product information, customer personal information (e.g., names, addresses, phone numbers, social security numbers (SSNs), sex, date of birth, marital status, etc.), financial data, or any other type of data that may be duplicated across multiple records.

When an input file is received, the SBR generation logic 220 notifies the update manager logic 210 that a matching operation is to be performed. The update manager logic 210 includes a query logic 214 that is configured to read SBR information from the master index database 205. In one embodiment, the query logic 214 is a Query Manager task that queries the master index database 205 to return values for selected match fields from SBRs stored in the database. The match fields are predefined and include fields that are used for matching operations. The SBR information may also include other information used for distributed matching, such as block fields, as will be described in more detail below. By returning only selected data fields, the amount of data returned by the query manager 214 is kept to a minimum, which enhances performance.

The block distributer logic 224 assigns each new record a global identifier (GID) by which the record is identified during matching. SBR match field values returned by the query logic 214 and provided to the block distributor logic 224 are assigned an EUID that corresponds to the EUID of the corresponding SBR. Thus, the new records can be distinguished from the SBRs. The block distributer logic 224 distributes the SBR match fields, identified by their EUIDs, into block buckets. The block distributor logic 224 also distributes input records, identified by their GIDs, into the block buckets. The block definitions used to create the block buckets are based, at least in part, on the SBR information that is provided by the update manager logic 210.

In one embodiment the input records are distributed by hashing input records into one or more block buckets. A bucket is a persistent container (i.e., a persisted hash table) that may include one or more blocks of input data. Each block of input data includes data that has a block definition in common. A block definition is constructed by specifying one or more data fields that each record that is included in a block should contain. For example, a block definition may be all records with first name "John" and last name "Smith." Thus, a block of data may include all data from records that have one or more common data fields.

The block distributor logic 224 is configured to apply a hash algorithm to obtain a hash value that corresponds to a bucket. The block distributor logic 224 then stores records that meet a block definition in a corresponding bucket. Each bucket may include data of more than one block, depending on the hash value obtained when a particular data field is hashed to obtain a bucket number or bucket ID. For example, if the hash of record "JohnSmith" MOD N (where N is the number of buckets) equals 3, then all "JohnSmith" records are stored in bucket 3. Similarly, it is possible that the hash value of "JoeSnow" records also equals 3, in which case all "JoeSnow" records are also stored in bucket 3.

The file system 221 is used for intermediate storage of data that is distributed into buckets, matched, or otherwise manipulated by the master or slave computing devices. Thus, the block distributor logic 224 stores the buckets including one or more blocks of data into a block bucket file 225 in the file system 221. The file system 221 may be any type of suitable file system, such as, a database file system, a disk file system (e.g., NTFS, FAT, ZFS, etc.), a transactional file system, a network file system, and so on.

The matcher logic 226 includes multiple distributed matchers (not shown) that are concurrently executed by multiple slave computing devices. Each matcher is configured to match the blocks of data stored in each bucket. More specifically, each matcher is configured to use probabilistic matching methods to generate and assign match weights to each pair of input records within a block of records. Match weights are calculated by comparing match field values. The matcher performs matching between new records and other new records and also between new records and SBRs. The matcher does not perform matching between SBRs. Each distributed matcher begins processing one bucket at a time, until all the buckets have been matched. The distributed matchers are also configured to output the matched data to one or more match files (not shown) stored in the file system 221.

In one embodiment, the match file includes a mapping of the GID of new records or the EUID of SBRs that are deemed to be matched based on a comparison of the match weight assigned to each record pair and the match threshold weight. For example, match files can contain record pairs corresponding to {GID1, GID2} or {GID3, EUID1}. The match file may store record pairs in a table that includes a GIDFrom column, GIDTo column, and a weight column. The GIDFrom column stores the identifier for a record that is matched to the record identified by the identifier in the GIDTo column. The weight column stores the match weight assigned to the matched pair of records. The weight may be calculated based on the number of match fields that each record in the matched record pair have in common, and the quality of the data in each match field of each record.

The EUID assigner logic 230 is a master task that is handled by the system 200. The EUID assigner logic 230 is configured to assign an EUID to each matching record pair that is linked in the match file. More specifically, the EUID assigner logic 230 obtains match files from the cluster synchronizer 228 and merges the match files into the one large match file 227. Using the merged match file 227, the EUID assigner logic 230 assigns the same EUID to match file items that match either directly or indirectly. A match file item may be a GID that identifies a new record or a EUID that identifies an SBR. For example, suppose match file items 1 and 8 are a matching pair, and match file items 3 and 8 are also a matching pair. In this case, the same EUID is assigned by the EUID assigner logic 230 to items 1, 3, and 8. If any matching item is an EUID, that EUID is assigned to the other matching items. Thus, if item 3 is an EUID, the EUID for item 3 is assigned to the other records 1 and 8.

The EUID assigner logic 230 is also configured to create and store a new incremental EUID index file that is added to existing incremental EUID index files (not shown) to construct an EUID index file. The EUID index file is of fixed record format. The total number of records in the EUID index file is the total number of input records (e.g., the number of GIDs). The index entry for each GID contains the EUID to which the GID is assigned. Thus, the entry for GID 3 is the third entry in the EUID index file and would contain the EUID for GID3. The entries in the EUID index file are populated with links found in the match file as described above.

The incremental EUID index file includes a mapping of newly created EUIDs for sets of matched items that include only new records (e.g., records that do not match an existing SBR). The incremental EUID index file is also stored in the file system 221 and used as a random access file. One or more other incremental EUID index files are already stored in the file system for the records that were matched to create the SBRs in the master index database 205. The other incremental EUID index files do not need to be updated, because they contain information for records that were matched in prior operations and still have the same EUID. The incremental EUID index files are ordered by GID. Thus, the EUID for any record (e.g., GID) can be quickly retrieved by accessing the incremental EUID index files and locating the GID for the record.

To enable updating of existing SBRs, the EUID assigner logic 230 reads the match file 227 and creates a matched EUID file (not shown) that lists EUIDs (e.g., SBRs) that form match pairs with GIDs (e.g., new records). The EUIDs in the matched EUID file identify SBRs that need to be updated to reflect a new record. The query logic 214 queries the master index database 205 to retrieve a more complete set of information for each SBR identified in the matched EUID file. The information may include a complete SBR with all data field values as well as information about the individual records that were used to compile the SBR. The augmented SBR information is converted into data objects for distribution into EUID buckets as follows.

The EUID assigner logic 230 distributes data objects that correspond to records (either new or SBR) into EUID bucket files. More specifically, the EUID assigner logic 230 is configured to assign EUIDs to input records that belong to the same overall profile using the EUID index file and the merged match file 227 described above. To allocate input records to a particular EUID bucket, a hash function is applied to the EUID assigned to each GID. Thus, records with the same EUID are assigned to the same EUID bucket. More than one EUID can hash to the same EUID bucket. The EUID buckets are stored in the EUID Index file 231 in the file system 221.

The SBR creation logic 232 is a distributed task that may be performed by one or more distributed slave computing devices working in parallel. The SBR creation logic 232 is responsible for generating SBR master image files for storage as SBRs in the master index database 205. For each SBR, the SBR creation logic 232 obtains each EUID from a corresponding EUID bucket and creates a single best record (SBR) by merging/combining all the data objects with the same EUID using a survivorship function. For "old" SBRs that are existing SBRs that have been updated based on new records, the SBR generation logic 220 creates a transaction "delta" and writes the transactions to a transaction "LOBFILE" (e.g., SQL Loader blob file). The transactions are executed on the master index database 205 by a batch update logic 218. In one embodiment, the batch update logic 218 utilizes a Java Database Connectivity (JDBC) loader. The batch update logic may use any other type of loader that is well suited for updating existing records in the master index database 205.

For new SBRs, the SBR creation logic 232 stores the new SBRs in master image files 234. The master image files 234 are flat transaction files capable of being loaded into the master index database 205. A master image file may include more than just the SBR for each group of records with a common EUID. For example, the master image files may include all the input records, the SBR, and the EUIDs for each input record. The loader logic 236 loads the master image files 234 into the master index database 205. In one embodiment, the data loader 236 is a database bulk loading tool, such as SQL Loader that is well suited to inserting new data into a database.

Figure 3:
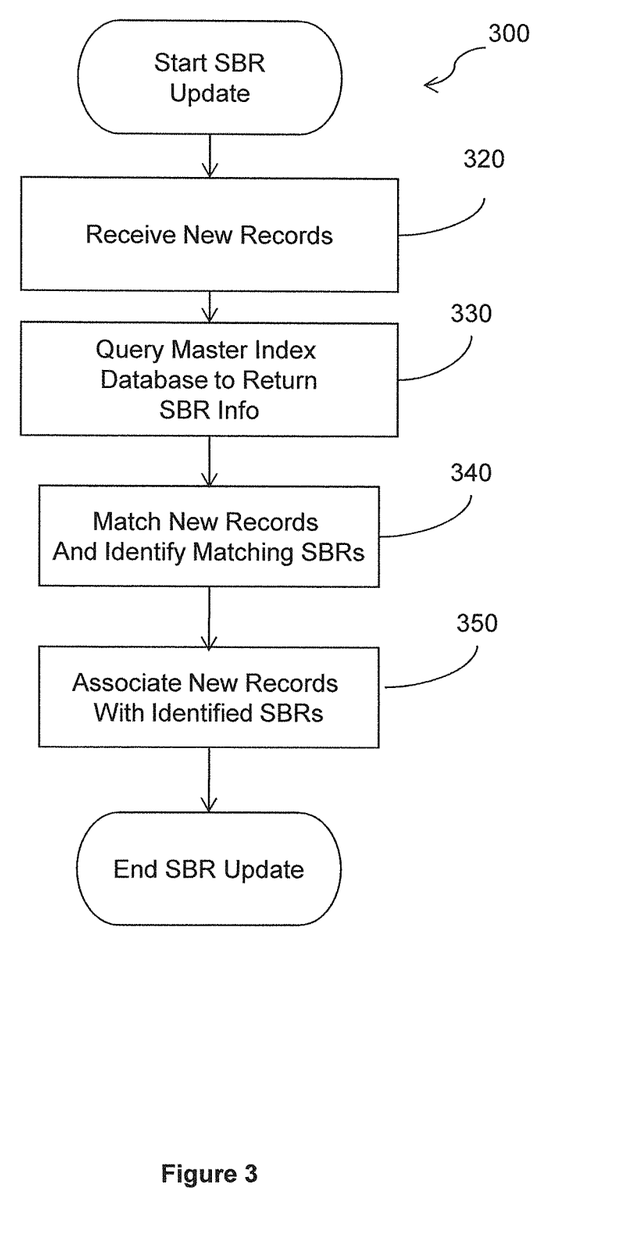
FIG. 3 illustrates one embodiment of a method associated with distributed bulk matching that enables updates to existing matched data.

FIG. 3 illustrates one embodiment of a method 300 of updating results of a bulk matching process is illustrated. The method 300 includes, at 320, receiving a new record for matching with old records. The new record includes new record match field values in one or more selected data fields. The method includes, at 330, querying a master index database that stores respective single best records (SBR) for respective sets of matching records to return SBR match field values for the SBRs.

At 340, the new record is matched to the other records by comparing the new record match field values to the SBR match field values. An SBR having similar SBR match field values as compared to the new record match field values is identified. At 350, the method includes associating the new record with the identified SBR in the master index database. In one embodiment, the new record is associated with the SBR by appending an identifier for the new record to a EUID identifier for the identified SBR. The EUID identifier is a linked list of records that are associated with an entity described by the SBR.

In one embodiment, the matching is performed by distributing the SBR match field values amongst a plurality of block buckets such that each block bucket contains match field values for one or more SBRs. For each block bucket, in parallel, the new record match field values are matched to the SBR match field values in the block bucket.

In one embodiment, one or more SBR data fields is updated based on the new record to create an updated SBR. The updated SBR is stored in the master index database. The master index database may be queried to return remaining SBR data field values for the identified SBR and one or more of the remaining SBR data field values is updated based on the new record. In one embodiment, a transaction to update the SBR is created and the transaction is executed as part of a batch update to the master index database.

When new records are received that do not match an existing SBR, the method may include matching the second match field values with the third record match field values to determine if the second and third records match one another. When the second and third new records match one another, a new SBR is created based, at least in part, on the second and third new records. The new SBR is stored in the master index database. The storing may be performed by creating a flat file describing the new SBR and loading the flat file into the master index database using a command line loader. In one embodiment, storing an updated SBR in the master index database may be performed using a different loading technique than when a new SBR is loaded into the master index database.

Figure 4:
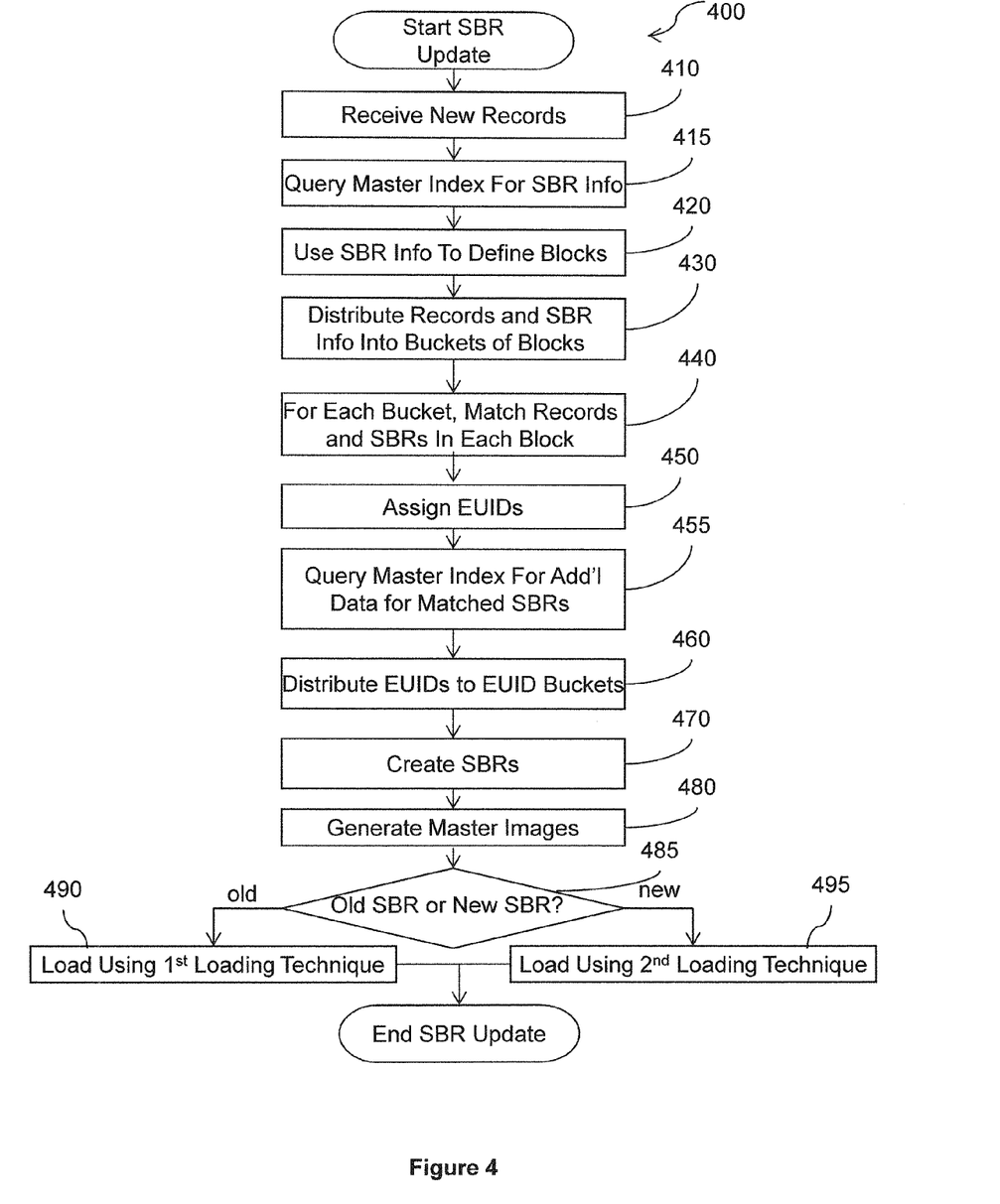
FIG. 4 illustrates one embodiment of a method associated with distributed bulk matching that enables updates to existing matched data.

FIG. 4 outlines one example embodiment of a method 400 for performing bulk distributed matching that includes updating previous matching results. At 410, one or more new records are read from one or more sources. As described above, the new records may be obtained from one or more customer databases, file systems, persistent storage, or any other suitable storage medium on which record data may be stored. A global identifier (GID) is allocated to each input record. The GID uniquely identifies a record across all systems. The GID may be assigned using sequential positive integers. Alternatively, GIDs may be assigned using any other type of numerical, alphabetical alpha-numerical, and/or character allocation mechanism.

At 410, the master index is queried for SBR information. The SBR information is a portion of an SBR and may include values for one or more selected data fields, such as match fields and fields that define blocks that were used in the matching that produced the SBRs. At 420, the SBR information is used to define blocks. At 430, block distribution is performed on the new records and the SBR information, which will be collectively referred to as "items" for simplicity.

In one embodiment, block distribution is performed using one or more types of hashing algorithms. Block distribution involves two steps. First, a block definition is defined to allocate items with one or more common data fields to the same block. The number and categories of common data fields that make up a block definition is determined from the SBR information so that the update process uses the same processing parameters as earlier matching processes that produced the existing SBRs. Second, each block of items is allocated to a bucket using a hash algorithm to obtain a hash value of the block of items. As described above, a bucket is a container of one or more blocks. Allocating each block of items to a bucket ensures that one group of records is stored in only one bucket. For example, all "JohnSmith" items are allocated to the same bucket.

At 440, distributed matching is performed for each block of items contained in each bucket. Matching is performed between the new records and the SBR information and also between new records. Matching is not performed between SBR information because matching has already been performed in a previous iteration between the records that produced the SBR information. Distributed matching results in assigning a match weight to each item pair within a block of items, and determining whether the match weight is greater or less than a match threshold weight. The match threshold weight may be a predefined user-selected match weight. In one or more embodiments of the invention, the match threshold weight may be computed using probability and/or statistical algorithms that estimate how similar two items have to be in order to consider the items a match. Not all items included in a block of items match at least one other item in the block of items. That is, a new record within a block of records may not be a match to any other item in the block of items. However, the unmatched new record may be a match to a new record included within another block of records.

In addition to matching within each block of items in each bucket, performing concurrent matching operations on each block of items also includes matching new records across each block of items to obtain matched sets of items. In one embodiment of the invention, each matched set of items may include new records that are determined to be a match within a particular block of items, and also across one or more blocks of items. Said another way, the matched sets of items are not limited to being from the same block of items. Thus, matching is performed across blocks of items to determine which new records match each other and are determined to describe the same entity.

To match a block of items, every new record in the block is matched with every other item in the block. Further, after each block of items is matched, the match files created by each concurrently executing computing device are merged into a large match file that is used to obtain the matched sets of items across one or more blocks.

The matching between blocks may be performed using well known fuzzy logic algorithms, such as string matching algorithms (e.g., JARO-Winkler algorithm) or any other suitable matching algorithm known in the art. In embodiment, a different computing device picks up one bucket at a time to process (e.g., perform matching functions). Once the current bucket is processed, the computing device picks up the next unassigned bucket. Each computing device that performs matching on a bucket stores the links for matching items in a separate match file.

The distributed matching performed at 440 allows for a completely dynamic load balancing method of matching among different slave computing devices working in parallel to complete a single task. At any given point in time, all slave computing devices are performing the same task. That is, during the distributed matching phase of the bulk distributed matching and loading, all slave computing devices and the master bulk matcher and loader are performing matching. In one or more embodiments of the invention, the next task is commenced only after completion of the current task by all the computing devices.

At 450, an EUID is assigned to new records to group the new records with other new records and/or with SBR information with which they match. To assign EUIDs to matching records, the match files stored by different computing devices during the distributed matching are merged. The merged match file includes both forward and backward match links for each item pair that is determined to be a match. For example, if items 1 and 8 are a matching pair, and items 3 and 8 are also a matching pair, the same EUID is assigned to items 1, 3, and 8. If any matching item is an SBR with an existing EUID, that EUID is assigned to the other matching items. Thus, if item 3 has an EUID, the EUID for item 3 is assigned to the other records 1 and 8.

When a new record is assigned an existing EUID (e.g., matches existing SBR information), the SBR associated with the existing EUID will updated to include the new record as described below. New EUIDs are created and maintained in an incremental EUID index file. The EUID index file is a random access file used to allocate EUIDs to input data (e.g., records). Initially, the incremental EUID index file is initialized to assign a default EUID (e.g., all zeros) to each input record identified by its GID. For every GIDFrom that appears in the merged match file, the record position of the GIDFrom is noted and set as the position of the GID in the EUID index file.

The incremental EUID index file is structured so that each EUID of a new record may be found at the corresponding record GID value. In other words, the EUID of GID value 100 may be found at record #100 in the incremental EUID index file. The merged match file is read to determine the position of each GIDFrom, and the corresponding position is inserted into the incremental EUID index file. That is, the merged match file and the new records are compared to create and populate the EUID file. In this manner, both the merged match file and the EUID index file are used to allocate EUIDs to each record. The total number of records in the EUID index file is equal to the total number of input records and the maximum GID value (assuming the GID value is assigned sequentially).

Upon initialization of the EUID index file with default values, each set of records that match are assigned the same EUID value. A set of new records that have a new EUID may include more than just a pair of matching records. For example, if record GID 1 matches record GID 3, and record GID 3 matches record GID 6, then record GID 1 also matches to record GID 6, and all three records (1, 3, and 6) are assigned the same EUID value. Thus, in one or more embodiments of the invention, recursive links are found in the merged match file so that the same EUID can be assigned to each matching record. Using the example from above, records with GID 1, 3, 6, and 8 would be assigned the same EUID. A unique EUID is assigned to any GID that does not appear in the merged match file (i.e., an input record that does not have any matching records).

One or more other incremental EUID index files are already stored in the file system for the records that were matched to create the SBRs in the master index database. The other incremental EUID index files do not need to be updated, because they contain information for records that were matched in prior operations and still have the same EUID. The incremental EUID index files are ordered by GID. Thus, the EUID for any record (e.g., GID) can be quickly retrieved by accessing the incremental EUID index files and locating the GID for the record.

To enable updating of existing SBRs, at 450, in addition to the incremental EUID index file, a matched EUID file is created that lists EUIDs (e.g., SBRs) that form match pairs with GIDs (e.g., new records). The EUIDs in the matched EUID file identify SBRs that need to be updated to reflect a new record. At 455, the master index database is queried to retrieve a more complete set of information for each SBR identified in the matched EUID file. The information may include a complete SBR with all data field values as well as information about the individual records that were used to compile the SBR. For example, a linked list that includes all records that were assigned a given EUID may be retrieved. The augmented SBR information is converted into data objects for distribution into EUID buckets at 460.

At 460, data objects that correspond to records (either new or SBR) are distributed into EUID bucket files. Each EUID value is hashed using a hash algorithm to distribute the data objects identified by the EUID values to buckets. Thus, each new record or SBR that is assigned the same EUID will be allocated to the same EUID bucket. Further, each EUID bucket may include more than one set of EUID values. Next, at 470, each EUID bucket is processed (i.e., matched) to create a new or updated SBR. The SBR is the most complete unified profile that matches all the records with the same EUID. When the SBR includes a linked list of records that were grouped in each EUID, the linked list is appended with the GID of new records that were assigned to the EUID.

At 480, the SBRs are transformed into master image files. AT 485, a determination is made as to whether a given SBR is "old" (e.g., an SBR that is stored in the master index database) or "new." If the SBR is old, at 490 the master image is loaded into the master index database using a first loading technique. In one embodiment, the first loading technique includes creating a transaction to update the SBR in the master index database with the new master image and executing the transaction as part of a batch update to the master index database. If the SBR is old, at 495 the method includes loading the master image into the master index database using a second loading technique. In one embodiment, the second loading technique includes creating a flat file describing the new SBR loading the flat file into the master index database using a command line loader.

The master image files may include more than just the single best record entries. For example, the original input records, and the EUID values corresponding to each single best record may also be stored in master image files. Further, as described above because the methods described herein provide update functionality, the master index database need not be empty before the master image files are loaded.

Figure 5:
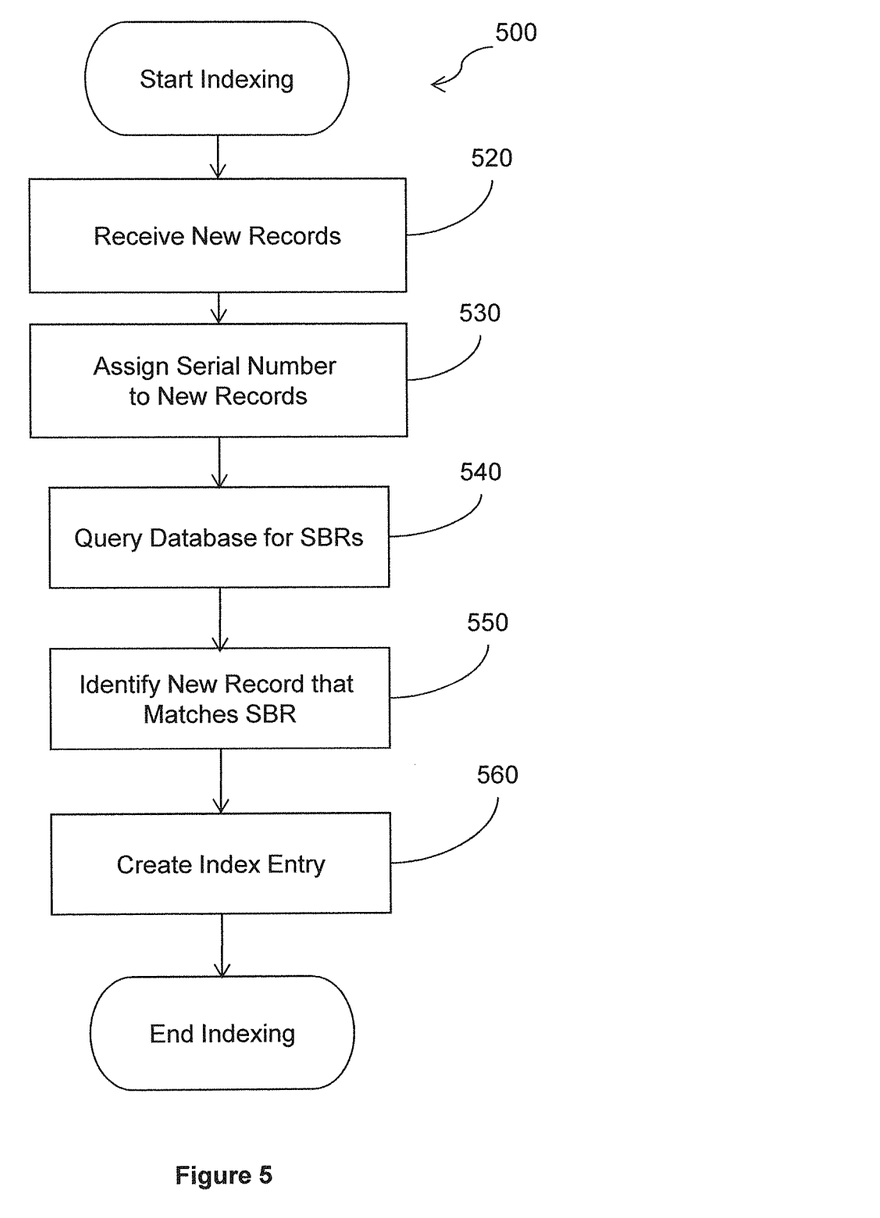
FIG. 5 illustrates one embodiment of a method associated with distributed bulk matching that enables updates to existing matched data.

FIG. 5 illustrates one embodiment of a method 500 of updating results of a bulk matching process by creating an index file is illustrated. The method 500 includes, at 520, receiving a new record for matching with old records. At 530, the method includes assigning each new record a unique serial number. At 540, the method includes querying a database that stores respective single best records (SBR) for respective sets of matching old records to return existing SBRs. At 550, the method includes identifying a new record that matches an existing SBR. At 560, the method includes creating an entry in an index file for the new record that includes the serial number of the new record and an identifier of the SBR.

In one embodiment, the entry is created by adding a row to an incremental index file. The incremental index file is configured to be combined with other incremental index files to create an overall index file for the old and new records. The new record is stored in a row corresponding chronologically to the serial number for the new record. The method may also include identifying a new record that does not match an existing SBR; creating a new SBR for the new record; and creating an entry in an index file for the new record that includes the serial number of the new record and an identifier of the new SBR.

General Computer Embodiment

Figure 6:
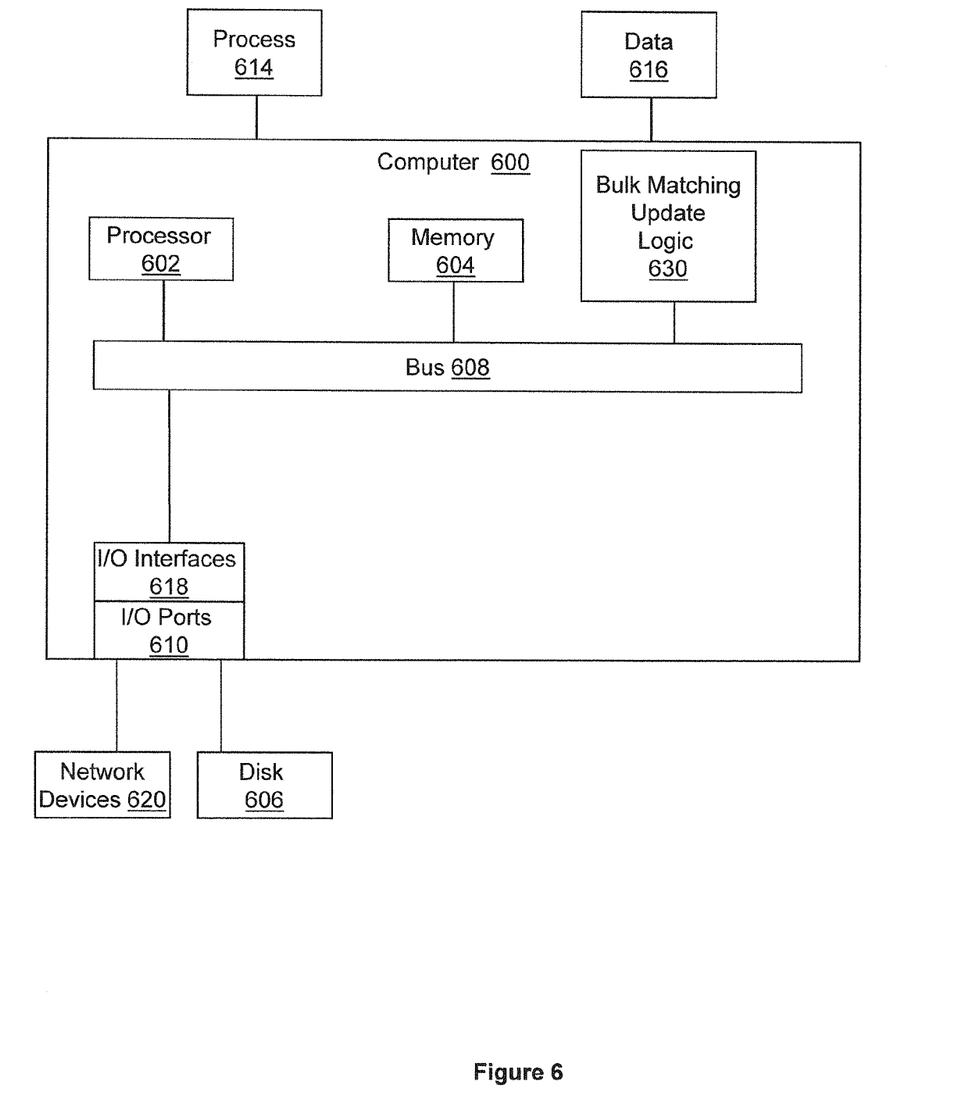
FIG. 6 illustrates an embodiment of a computing system in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a bulk matching update logic 630 configured to facilitate bulk matching with update. In different examples, the logic 630 may be implemented in hardware, a non-transitory computer-readable medium with stored instructions, firmware, and/or combinations thereof. While the bulk matching update logic 630 is illustrated as a hardware component attached to the bus 608, it is to be appreciated that in one example, the bulk matching update logic 630 could be implemented in the processor 602.

In one embodiment, bulk matching update logic 630 is a means (e.g., hardware, non-transitory computer-readable medium, firmware) for bulk matching with update.

The means may be implemented, for example, as an ASIC programmed to update results of prior bulk matching without re-performing the prior bulk matching operations. The means may also be implemented as stored computer executable instructions that are presented to computer 600 as data 616 that are temporarily stored in memory 604 and then executed by processor 602.

Bulk matching update logic 630 may also provide means (e.g., hardware, non-transitory computer-readable medium that stores executable instructions, firmware) for updating results of prior bulk matching without re-performing the prior bulk matching operations.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods and techniques described in FIGS. 1-5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computing device", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Query", as used herein, refers to a semantic construction that facilitates gathering and processing information. A query may be formulated in a database query language (e.g., SQL), an OQL, a natural language, and so on.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to:

store, in a database, i) a plurality of old records each describing a given entity and ii) single best records (SBRs) that group the records by entity, where each respective SBR includes i) SBR data fields storing data that describe a respective unique entity and ii) an identifier for each record in the database that describes the entity;

receive a set of new records for matching with the old records, where each new record includes a new record match field value in a selected record data field, and wherein each new record describes only a single entity such that each new record matches at most a single SBR;

perform matching between each new record in the set of new records and the SBRs and:

when a first new record matches a first identified SBR create a first transaction to update one or more SBR data fields in the first identified SBR based on the first new record; and when a second new record matches a second identified SBR, create a second transaction to update one or more SBR data fields in the second identified SBR based on the second new record;

when a third new record does not match any SBR:
create a first new SBR for a new entity based, at least in part, on the third new record; and
create a first image file describing the first new SBR;

when a fourth new record does not match any SBR:
create a second new SBR for a new entity based, at least in part, on the third new record; and
create a second image file describing the second new SBR;

after matching has been performed for all new records in the set of new records:
execute the first transaction and the second transaction to update the first identified SBR and the second identified SBR during a single batch update to the database; and
load the first image file and the second image file into the database using a database loader.

2. The non-transitory computer-readable medium of claim 1, where the matching comprises:
distributing SBR match field values amongst a plurality of block buckets such that each block bucket contains SBR match field values for one or more SBRs; and
for each block bucket, matching new record match field values to the SBR match field values in the block bucket, where the matching for block buckets is performed in parallel such that matching for at least two block buckets is performed simultaneously.

3. The non-transitory computer-readable medium of claim 1, further comprising instructions configured to cause the computer to:
append an identifier for the first new record to a EUID identifier for the first identified SBR;
append an identifier for the second new record to a EUID identifier for the second identified SBR,
where the EUID identifier comprises a linked list of records that are associated with the entity described by the SBR.

4. The non-transitory computer-readable medium of claim 1 where operations that accomplish one or more of the matching and executing are performed in parallel, on multiple computing machines.

5. A computing system, comprising:
a hardware processor;
a database configured to store i) a plurality of old records each describing a given single entity and ii) single best records (SBRs) that group the records by entity; where each respective SBR includes i) SBR data fields storing data that describe a respective unique entity and ii) an identifier for each record in the database that describes the entity;

an SBR generation logic configured to receive a set of new records for matching with old records, wherein each new record describes only a single entity such that each new record matches at most a single SBR; and an update manager logic configured to cause the hardware processor to:
match the set of new records to the old records and:
when a first new record matches a first identified SBR, create a first transaction to update one or more SBR data fields in the first identified SBR based on the first new record; and
when a second new record matches a second identified SBR, create a second transaction to update one or more SBR data fields in the second identified SBR based on the second new record;
when a third new record does not match any SBR:
create a first new SBR for a first new entity based, at least in part, on the third new record; and
create a first image file describing the first new SBR;
when a fourth new record does not match any SBR:
create a second new SBR for a second new entity based, at least in part, on the fourth new record; and
create a second image file describing the second new SBR; and
after matching has been performed for all new records in the set of new records:
execute the first transaction and the second transaction to update the first identified SBR and the second identified SBR during a single batch update to the database; and load the first image file and the second image file into the database using a database loader.

6. The computing system of claim 5,
where the new records comprise new record match field values in one or more selected data fields;
where the SBR information for each SBR comprises SBR match field values for the selected data fields in the SBR; and
where the SBR generation logic is configured to, for each new record, compare the new record match field values to the SBR match field values and identify an SBR having similar SBR match field values as compared to the new record match field values for the new record.

7. The computing system of claim 6, where the update manager logic is further configured to:
distribute SBR match field values amongst a plurality of block buckets such that each block bucket contains match field values for one or more SBRs; and
for each block bucket, match new record match field values to the SBR match field values in the block bucket, where the matching for block buckets is performed in parallel such that matching for at least two block buckets is performed simultaneously.

8. The computing system of claim 5, where the SBR generation logic is configured to control multiple computing machines to perform the matching in parallel.

9. A computer-implemented method, comprising:
storing, in a database, i) a plurality of old records each describing a given entity and ii) single best records (SBRs) that group the records by entity, where each respective SBR includes i) SBR data fields storing data that describe a respective unique entity and ii) an identifier for each record in the database that describes the entity, receiving a set of new records for matching with the old records, where each new record includes a new record match field value in a selected record data field, and wherein each new record describes only a single entity such that each new record matches at most a single SBR;
performing matching between each new record in the set of new records and the SBRs:
  when a first new record matches a first identified SBR, creating a first transaction to update one or more SBR data fields in the first identified SBR based on the first new record; and
  when a second new record matches a second identified SBR, creating a second transaction to update one or more SBR data fields in the second identified SBR based on the second new record;
  when a third new record does not match any SBR:
    creating a first new SBR for a first new entity based, at least in part, on the third new record; and
    creating a first image file describing the first new SBR;
  when a fourth new record does not match any SBR:
    creating a second new SBR for a second new entity based, at least in part, on the fourth new record; and
    creating a second image file describing the second new SBR;
after matching has been performed for all new records in the set of new records:
  executing the first transaction and the second transaction to update the first identified SBR and the second identified SBR during a single batch update to the database; and
  loading the first image file and the second image file into the database using a database loader.

10. The computer-implemented method of claim 9, where the matching comprises:
  distributing SBR match field values amongst a plurality of block buckets such that each block bucket contains SBR match field values for one or more SBRs; and
  for each block bucket, matching new record match field values to the SBR match field values in the block bucket, where the matching for block buckets is performed in parallel such that matching for at least two block buckets is performed simultaneously.

11. The computer-implemented method of claim 9, further comprising:
  appending an identifier for the first new record to a EUID identifier for the first identified SBR;
  appending an identifier for the second new record to a EUID identifier for the second identified SBR,
  where the EUID identifier comprises a linked list of records that are associated with the entity described by the SBR.

12. The computer-implemented method of claim 9, where the matching or the executing are performed in parallel, on multiple computing machines.

* * * * *